United States Patent [19]

Uri

[11] Patent Number: 4,703,721

[45] Date of Patent: Nov. 3, 1987

[54] SUSPENSION-TYPE POULTRY DRINKING FOUNTAIN

[75] Inventor: Ehud Uri, DN Menashe, Israel

[73] Assignee: Plasson Maagan Michael Industries Ltd., DN Menasne, Israel

[21] Appl. No.: 866,717

[22] Filed: May 27, 1986

[30] Foreign Application Priority Data

Jun. 28, 1985 [IL] Israel ............................................ 75667

[51] Int. Cl.$^4$ ................................................ A01K 7/00
[52] U.S. Cl. ..................................................... 119/81
[58] Field of Search ....................... 119/72, 74, 78, 79, 119/80, 81; 137/408; 220/288, 290

[56] References Cited

U.S. PATENT DOCUMENTS

| | | | |
|---|---|---|---|
| 3,101,856 | 8/1963 | Whiteman, Jr. | 220/288 X |
| 4,421,061 | 12/1983 | Shomer | 119/81 |
| 4,613,063 | 9/1986 | Wright | 220/270 X |

FOREIGN PATENT DOCUMENTS 1238381  7/1971  United Kingdom .................. 119/81

Primary Examiner—Robert P. Swiatek
Attorney, Agent, or Firm—Benjamin J. Barish

[57] ABSTRACT

A suspension-type poultry drinking fountain comprises a bowl supported in suspension and containing a water trough for receiving water to be made available for drinking by the poultry, and a valve assembly controlled by the weight of the bowl to maintain a predetermined level of water in the trough. For prefixing the level of the water to be maintained in the trough, the valve assembly includes a rotatable member having a plurality of projections circumferentially spaced around its outer periphery and releasably engageable with a retainer member fixedly carried by the drinking fountain to releasably retain the rotatable member in a preselected rotary position against unintentional rotation, but permitting forceful intentional rotation in order to change the water level in a convenient manner without disassembling the drinking fountain or its valve assembly.

5 Claims, 4 Drawing Figures

SUSPENSION-TYPE POULTRY DRINKING FOUNTAIN

BACKGROUND OF THE INVENTION

The present invention relates to suspension-type poultry drinking fountain. The invention is particularly useful with respect to the suspension-type poultry drinking fountain illustrated in U.S. Pat. No. 4,421,061, and is therefore described below with respect to this application.

The above cited patent specification describes a suspension-type poultry drinking fountain comprising a bowl supported in suspension and containing a water trough for receiving water to be made available for drinking by the poultry, and a valve assembly controlled by the weight of the bowl to maintain a predetermined level of water in the trough. The valve assembly includes a rotatable member, in the form of a collar acting against a coil spring, for prefixing the level of the water to be maintained in the trough.

Such poultry drinking fountains are subjected to considerable abuse during their handling and use, and it therefore frequently occurs that the rotatable collar is unintentionally moved such as to change the level of the water to be maintained in the trough. This requires frequent readjustment of the rotatable collar, which is a time-consuming process particularly since the drinking fountains are used in large quantities in many installations. In order to minimize the frequency of readjustment, they have been provided with lock-nuts which lock the rotatable collar in position to prevent unintentional movements during handling and use, but it has been found that readjustment is still frequently required, and when lock-nuts are used, they merely add to the time for making the readjustment.

BRIEF SUMMARY OF THE INVENTION

An object of the present invention is to provide an improvement to the suspension-type poultry drinking fountain which not only decreases the frequency of readjustment, but also permits readjustment in a quick and facile manner.

According to the present invention, there is provided a suspension-type poultry drinking fountain comprising a bowl supported in suspension and containing a water trough for receiving water to be made available for drinking by the poultry, and a valve assembly controlled by the weight of the bowl to maintain a predetermined level of water in the trough. For prefixing the level of the water to be maintained in the trough, the rotatable member is rotatable about an axis and is movable axially to different adjusted positions with respect thereto. The rotatable member includes a plurality of projections circumferentially spaced around its outer periphery and releasably engageable with a retainer member fixedly carried by the drinking fountain to releasably retain the rotatable member in a preselected rotary position against unintentional rotation, but permitting forceful intentional rotation in order to change the water level in a convenient manner without disassembling the drinking fountain or its valve assembly. The retainer member is fixed to the drinking fountain and has an edge parallel to the vertical axis of the rotatable member for engagement by the projections on the rotatable member, and has a length equal at least to the distance of travel of the projections on the rotatable member for all adjusted positions thereof.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
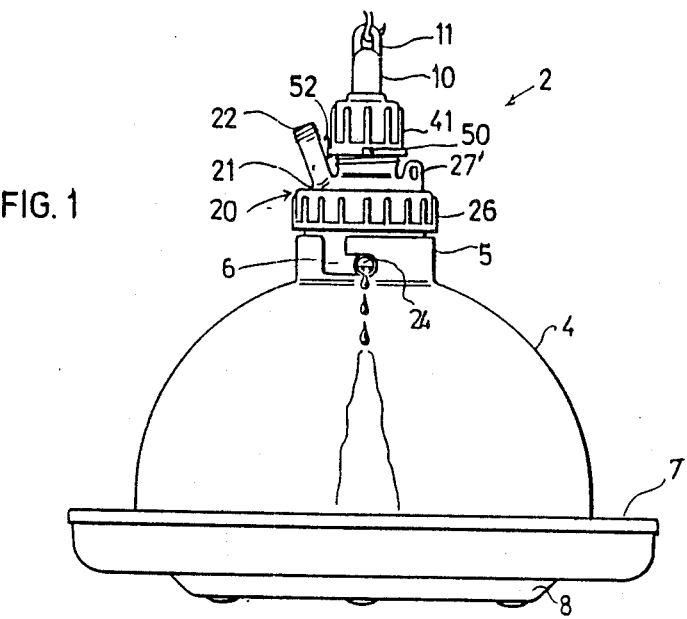
FIG. 1 is a side elevational view illustrating one form of suspension-type poultry drinking fountain constructed in accordance with the present invention.
Figures 3, 4:
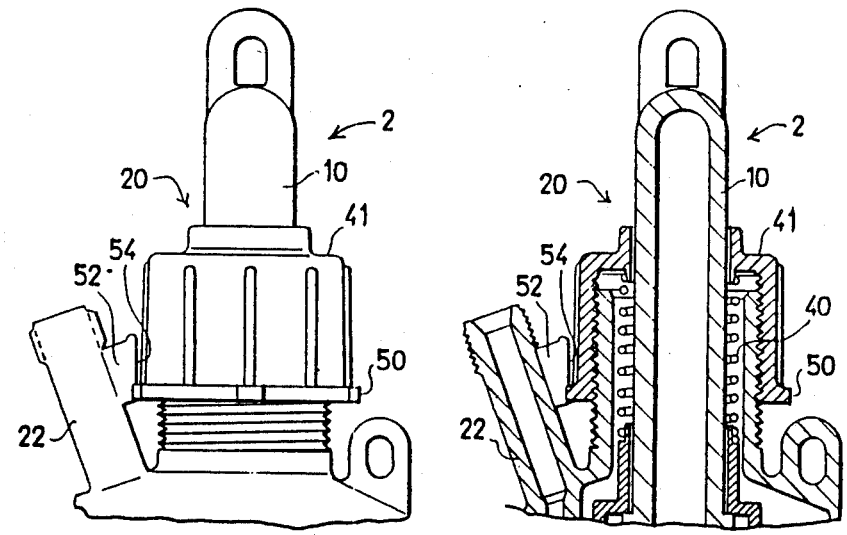
FIG. 3 is an enlarged fragmentary view illustrating only the portion of the poultry drinking fountain including the arrangement for prefixing the level of the water to be maintained in the trough.
FIG. 4 is a longitudinal sectional view of FIG. 3.
Figure 2:
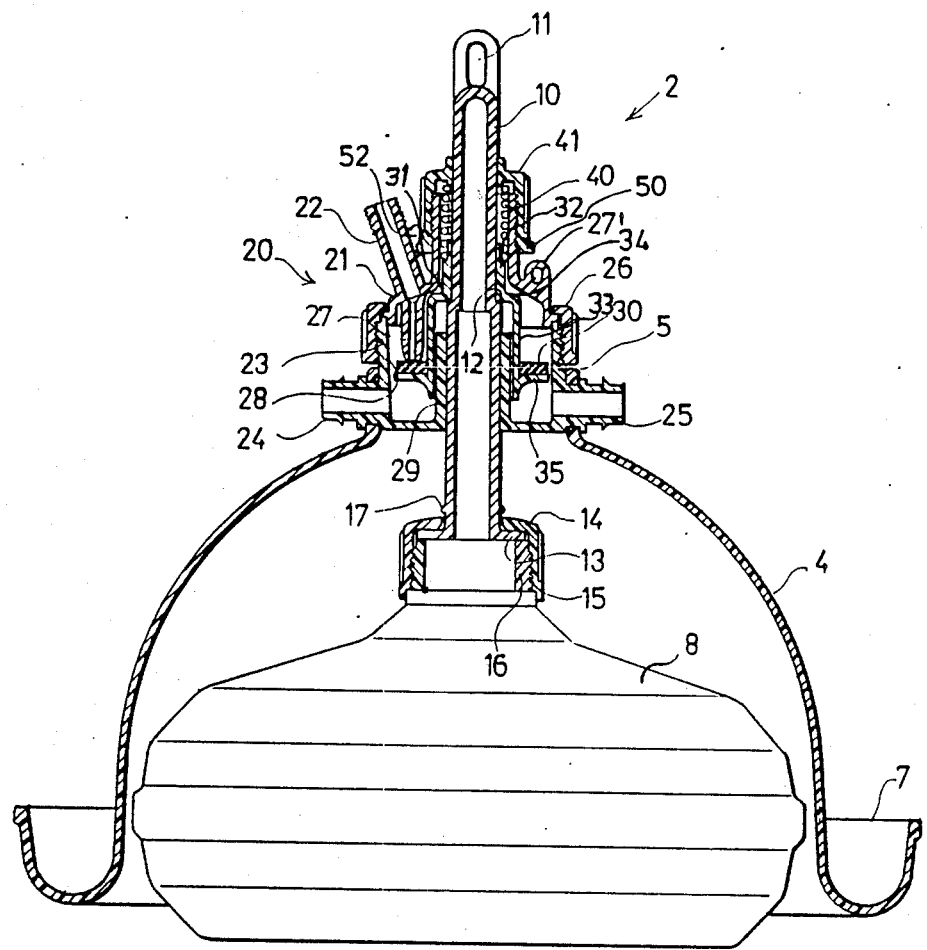
FIG. 2 is a longitudinal sectional view of the poultry drinking fountain of FIG. 1.

The poultry drinking fountain illustrated in the drawings is of the type described in the above-cited U.S. Pat. No. 4,421,061. It comprises a hanger assembly, generally designated 2, adapted to be supported in suspension; a bowl, generally designated 4, including at its upper end a circular section 5 formed with bayonet-slots 6 for attachment to the hanger assembly and containing, at its lower end, a water trough 7 for receiving water to be made available for drinking by the poultry; and a ballast bottle 8 attachable to the lower end of the hanger assembly and disposed within the bowl 4 for minimizing swinging of the fountain when suspended. The ballast bottle 8 depends slightly below the bottom of the water trough 7 so that the fountain may also be supported directly on the ground from the ballast bottle, this being desirable in order to locate the water trough 7 close to the ground for access by young chicks.

With respect to the hanger assembly 2, the main components are: a vertical stem, generally designated 10, for supporting the fountain in suspension; a valve housing, generally designated 20, including a water inlet, a water outlet, and a valve for controlling the flow of the water to the water trough 7; an annular resilient gasket 30 circumscribing the stem 10 and cooperable with the valve housing 20 for controlling the flow of the water to the latter housing; and a coil spring 40 mounting the valve housing to the stem such that the weight of the water in the water trough 7 controls the valve within the housing 20 to automatically maintain a predetermined level of water within the water trough.

As the poultry drink from the water within the trough 7, the spring mounting of the bowl 4 and hanger assembly 2 causes the valve within the valve housing 20 of the hanger assembly to automatically replenish the water so as to maintain the water at a predetermined level in the trough. In addition, the mounting of bowl 4 to the hanger assembly 2 via the bayonet-slots 6 permits quick attachment and detachment of the bowl with respect to the hanger assembly, thereby permitting the cleaning of the bowl whenever desired without disturbing the valve housing or otherwise disassembling any of the parts of the fountain.

More particularly, the stem 10 is of hollow tubular construction. It includes a hook or eye 11 at its upper end for attachment, as by a rope or cord, to an overhead ceiling for supporting the fountain in suspension. Stem 10 is further formed with an annular shoulder 12 about mid-way of its length for a purpose to be described below. The bottom end of the stem terminates in an annular flange 13 adapted to receive a collar 14. Collar 14 is internally threaded, as shown at 15, for threading onto the externally-threaded neck 16 of the ballast bottle 8. In addition, stem 10 is formed with an annular rib 17 just above collar 14 to prevent the accidental removal of the collar.

Valve housing 20 is comprised of an upper section 21 containing a tubular water inlet 22; a lower section 23 containing two water outlets 24, 25; and a collar 26 receivable on the upper housing secton 21 and threadable to the lower housing section 23 for attaching the two section together. The upper valve housing section 21 further includes a hollow conduit member 27 depending in the vertical direction below the water inlet 22 and serving as an extension thereof. The upper housing section 21 futher includes a hook or eye 27' for supporting the hanger assembly in suspension when the bowl 4 is detached for purposes of cleaning.

The lower valve housing section 23 includes an outer wall 28 of circular configuration received within the upper circular section 5 of the bowl 4, and an inner wall 29 also of circular configuration received on stem 10 of the hanger assembly. The two water outlets 24, 25 of the lower valve housing section 23 are of tubular configuration and project laterally at diametrically opposite sides of the housing; they serve as bayonet-pins cooperable with the bayonet-slots 6 formed at the upper end of bowl 4.

It will thus be seen that the bowl 4 may be quickly attached to the valve housing 20 by passing the tubular outlets 24, 25 into the bayonet-slots 6 on the opposite sides of the upper end of the bowl 4, and rotating the bowl to fix the tubular outlets within the slots. It will also be seen that the bowl can be as quickly detached from the valve assembly by rotating the bowl in the opposite direction with respect to the tubular outlets 24, 25.

The annular resilient gasket 30, cooperable with the tubular conduit 27 of the valve asembly for controlling the flow of the water to the trough 7, is supported on a holder 31 received over the hollow stem 10. For this purpose, holder 31 is formed with an upper annular section 32 of slightly larger diameter than the outer diameter of the stem 10 so as to be received thereover. Holder 31 is also formed with a lower annular section 33 of enlarged diameter so as to be received over wall 29 of the valve assembly 20 applied over the outer face of the stem. The juncture between the two sections 32 and 33 is defined by an annular shoulder 12 on stem 10 for fixing the position of holder 31 on the stem.

The lower end of holder 31 is formed with an annular ledge 35 for receiving the annular resilient gasket 30. Thus the gasket 30 is firmly supported in a horizontal position by means of holder 31.

Coil spring 40, which provides the spring mounting for the valve housing 20, is interposed between the upper end of the gasket holder 31 and a collar 41 threaded over the upper section 21 of the valve housing 20. It will be appreciated that the more the collar 41 is threaded onto housing section 21, the greater the compression applied by the collar to spring 40, thereby increasing the force applied by the spring in supporting the valve housing 20. Accordingly, collar 41 may be used for varying the force of spring 40, and thereby the level of the water maintained within the annular trough 7.

In accordance with the present invention, collar 41 is provides with a plurality of projections 50 circumferentially spaced around its periphery. These projections 50 cooperate with a retainer member 52 secured to, or integrally formed with, the inlet stem 22. Stem 22 is inclined with respect to the vertical axis of the fountain but retainer member 52 has an edge 54 extending parallel to the vertical axis of collar 41 and is of a width so as to be releasably engageable by projections 50 of collar 41 when the collar is rotated in order to prefix the level of the water to be maintained in the trough 7. Retainer member 52 is of a length equal at least to the distance of travel of projection 50 on collar 41 for all adjusted positions of the collar.

Thus, projections 50 engageable with retainer member 52 retain collar 41 against unintentional rotation, but permit the forceful intentional rotation of the collar in order to change the water level in a convenient manner by merely forcefully rotating the collar to cause the engaged projections 50 to snap-over to the other side of retainer member 54.

The poultry drinking fountain illustrated in the drawings operates in the following manner:

First, collar 41 is threaded onto the upper section 21 of the valve housing 20 an appropriate amount according to the desired water level to be maintained within the water trough 7. The fountain may then be suspended, by means of hook 11 of the hanger 10, from a suitable overhead support with the ballast bottle 8 applied to the lower end of the hanger stem 10. Thus, the valve housing 20, including the bowl 4 and the water trough 7 attached thereto, is supported from the hanger stem 10 by means of the coil spring 40. The tubular inlet 22 of the valve housing 20 is then connected to the water supply.

At the start, there is no water within the trough 7, so that the weight of the bowl 4, together with that of the valve housing 20, causes spring 40 to support the valve housing 20 at a high position such that the lower edge of the inlet conduit 27 within the valve housing is spaced upwardly from the annular gasket 30. Accordingly, water inletted into the tubular inlet 22 will flow betwen conduit 27 and gasket 30 to the tubular outlets 24, 25, and from there along the outer face of the bowl 4 to the annular trough 7. This water increases the weight of bowl 4, thereby causing the valve housing 20, to which the bowl is secured, to lower until the water reaches a level within trough 7 such that its weight causes the tubular conduit 27 to engage the annular gasket 30, thereby terminating the further flow of water into the annular trough.

As the poultry drink from the annular trough, the water level drops, thereby causing the valve housing 20 to rise again under the influence of spring 40 such that the lower edge of the tubular conduit disengages from the upper face of the annular gasket 30. This permits more water to enter via the inlet 22 and to exit via the outlet 24, until the predetermined water level within the trough is again reached. The valve arrangement thus automatically controls the water flow to the trough 7 so as to maintain the desired water level within the trough.

As indicated earlier, the desired water level within the trough is prefixed by collar 41, which adjusts the tension of spring 40. Collar 41 is retained in its adjusted position by its projections 50 engageable with retainer member 54, thereby preventing unintentional rotation, for example during the handling and/or use of the poultry drinking fountain. However, whenever it is desired to readjust the water level, the attendant merely needs to rotate collar 41 to forcefully cause one or more of its projections 50 to snap-over retainer member 54 to the desired adjusted position of the collar, whereupon it is again retained in that position by the projection 50 then engageable with retainer member 52.

The precise adjustment position of collar 41 is not so critical so that usually four projections 50 equally spaced around the circumference of collar 41 would be normally adequate to retain the collar in any preset position. However, in other applications it may be desired to include eight such projections or even more, for example a continuous series of such projections in the form of teeth disposed around the circumference of the collar where more precise positioning of the collar is desired.

Many other variations, modifications and applications of the invention will be apparent.

What is claimed is:

1. A suspension-type poultry drinking fountain comprising: a bowl supported in suspension and containing a water trough for receiving water to be made available for drinking by the poultry, and a valve assembly controlled by the weight of said bowl to maintain a predetermined level of water in said trough, said valve assembly including a rotatable member rotatable about an axis and movable axially of said axis to different adjusted positions with respect thereto for prefixing the level of the water to be maintained in said trough;

characterized in that said rotatable member includes a plurality of external projeections circumferentially spaced around its outer periphery and releasably engageable with a retainer member fixedly carried by said drinking fountain to releasably retain said rotatable member in a preselected rotary positoin against unintentional rotation, but permitting forceful intentional rotation in order to change the water level in a convenient manner without disassembling the drinking fountain or its valve assembly, said retainer member fixedly carrid by the drinking fountain having an edge parallel to the rotational axis of the rotatable member for engagement by said projections on the rotatable member, and having a length equal at least to the distance of travel of the projections on the rotatable member for all adjusted positions thereof.

2. The drinking fountain according to claim 1, wherein said valve assembly comprises a valve housing carried by the drinking fountain and including an inlet stem for the water, a water outlet, and a valve member for controlling the flow of the water to the water trough, said retainer member being fixed to said inlet stem.

3. The drinking fountain according to claim 2, wherein said fountain further comprises a hanger assembly including a vertical hanger stem supporting the bowl in suspension, and a coil spring mounting the valve housing to the hanger stem such that the weight of the water in the trough controls the valve member within the valve housing to automatically maintain a predetermined level of water in the trough, said rotatable member being a collar threadedly mounted on said vertical hanger stem for varying the force of said spring, and thereby the level of water maintained in said trough.

4. The drinking fountain according to claim 3, wherein said collar includes at least four of said projections circumferentially spaced around its periphery.

5. A suspension-type pountrY drinking fountain comprising: a bowl supported in suspension and containing a water trough for receiving water to be made available for drinking by the poultry; a valve assembly controlled by the weight of said bowl to maintain a predetermined level of water in said trough; said valve assembly comprising a valve housing carried by the drinking fountin and including an inlet stem for the water, a water outlet, and a valve member for controlling the flow of the water to the water trough; a hanger assembly including a vertical hanger stem supporting the bowl in suspension, and a coil spring mounting the valve housing to the hanger stem such that the weight of the water in the trough controls the valve member within the valve housing to automatically maintain a predetermined level of water in the trough; a collar threadedly mounted on said vertical hanger stem for varying the force of said spring, and thereby the level of water maintained in said trough; said collar including a plurality of projections formed on the outer surface of said collar and circumferentially spaced around its periphery; said inlet stem including a retainer member having an edge parallel to the vertical axis of the collar for engagement by said projections, and a length equal at least to the vertical distance of travel of said projections on said collar for all adjusted positions of said collar so as to releasably retain said collar in a preselected rotary position against unintentional rotation, but to permit forceful intentional rotation of the collar in order to change the water level without disassembling the drinking fountain or its valve assembly.

* * * * *